US007017802B2

(12) United States Patent
Gerlier

(10) Patent No.: US 7,017,802 B2
(45) Date of Patent: Mar. 28, 2006

(54) BANKNOTE STORE

(75) Inventor: Andre Gerlier, Sciez (FR)

(73) Assignee: Mars, Incorporated, McLean, VA (US)

( * ) Notice: Subject to any disclaimer, the term of this patent is extended or adjusted under 35 U.S.C. 154(b) by 264 days.

(21) Appl. No.: 10/100,885

(22) Filed: Mar. 19, 2002

(65) Prior Publication Data

US 2002/0148894 A1 Oct. 17, 2002

(30) Foreign Application Priority Data

Mar. 21, 2001 (EP) ................................ 01302603

(51) Int. Cl.
*G06F 17/60* (2006.01)

(52) U.S. Cl. ................................................ 235/379

(58) Field of Classification Search ................ 271/288, 271/250, 121; 235/381, 379; 209/584, 900
See application file for complete search history.

(56) References Cited

U.S. PATENT DOCUMENTS

| | | | | |
|---|---|---|---|---|
| 4,365,700 | A | 12/1982 | Arimoto et al. | |
| 4,571,489 | A | 2/1986 | Watanabe | |
| 5,062,340 | A * | 11/1991 | Greven | 83/95 |
| 5,116,037 | A | 5/1992 | Gerlier et al. | |
| 5,775,682 | A * | 7/1998 | Hosking et al. | 271/3.08 |
| 5,803,227 | A * | 9/1998 | Stein et al. | 194/206 |
| 5,810,349 | A * | 9/1998 | Bloser et al. | 271/213 |
| 5,951,008 | A * | 9/1999 | Williams et al. | 271/288 |
| 6,244,589 | B1 * | 6/2001 | Gerlier | 271/177 |
| 6,293,543 | B1 * | 9/2001 | Lawrence | 271/213 |
| 6,318,714 | B1 * | 11/2001 | Beskitt et al. | 271/10.01 |
| 6,331,000 | B1 * | 12/2001 | Beskitt et al. | 271/3.01 |
| 6,341,934 | B1 * | 1/2002 | Takeno et al. | 414/791.2 |
| 6,460,705 | B1 * | 10/2002 | Hallowell | 209/534 |
| 6,502,052 | B1 * | 12/2002 | Someya et al. | 702/128 |
| 6,607,189 | B1 * | 8/2003 | Cost et al. | 271/3.08 |

FOREIGN PATENT DOCUMENTS

| | | |
|---|---|---|
| EP | 0 994 445 A2 | 4/2000 |
| GB | 2 161 145 A | 1/1986 |

* cited by examiner

*Primary Examiner*—Ahshik Kim
(74) *Attorney, Agent, or Firm*—Fish & Richardson

(57) ABSTRACT

In a banknote store, banknotes are stacked such that alternate notes have their ends protruding from one end of the stack, with the intervening notes protruding from the opposite end. The topmost banknote can be dispensed individually by gripping the protruding end of the underlying banknote. A stack may be gripped at one end and/or along its edges while a new banknote is added to the store so that the new banknote does not shift the topmost banknote in the stack.

14 Claims, 14 Drawing Sheets

BANKNOTE STORE

This invention relates to the storage of banknotes or other sheets of value, which are herein referred to simply as banknotes or bills.

There have been proposed numerous types of banknote stores. Some enable dispensing of banknotes, for example in automatic cash dispensing machines. Others allow the addition of banknotes to the store, for example in vending machines. It is however not very common to have storage means which can both receive and dispense individual banknotes, because the mechanisms used hereto for achieving this have been unreliable, expensive, complicated and/or large, which has meant that the mechanisms have been unsuitable especially for use in vending applications. The various techniques used for achieving dispensing of individual banknotes has included suction for lifting the topmost banknote from a stack, or the application of friction, for example to cause a buckling configuration of the uppermost banknote to enable it to be stripped from the stack.

Some aspects of the present invention relate to techniques for enabling banknotes to be individually dispensed from a store. Other aspects relate to techniques for individually adding banknotes to a store. Preferably, these aspects are combined in a banknote store which can both receive banknotes individually and dispense them individually. However, the invention is also applicable to stores which have a pre-formed stack therein, from which banknotes can be individually dispensed, and stores which can receive banknotes individually but which either cannot dispense banknotes or can only dispense them as a bundle.

According to a first aspect of the present invention, banknotes are stored at staggered positions within a stack such that each banknote has an edge extending beyond the edge of an adjacent banknote. This provides a means whereby the adjacent banknote can be dispensed while holding the edge of the next banknote, so only a single banknote is dispensed.

The invention will be described in the context of a store which has a banknote stack whose thickness dimension extends substantially vertically, and wherein banknotes are added to, and dispensed from, the top of the stack. However, the orientation can be varied if desired.

Preferably, successive banknotes in the stack each have opposite ends projecting beyond the respective overlying banknote. To dispense the banknotes, the projecting ends at one side of the stack are gripped while the topmost banknote is being dispensed, and then the next banknote is dispensed while gripping the projecting ends at the opposite side of the stack.

In the preferred embodiment, the stack is formed by individually directing banknotes to the stack alternately via two different paths, each of which sends a banknote to a particular lateral location, so that the banknotes sent via one path are offset laterally with respect to the banknotes sent via the other path.

The banknote store may be housed in an apparatus including a banknote validator, and allows storage of received banknotes and individual dispensing of the banknotes as change. The banknotes within the stack may be of a plurality of denominations, in which case there are preferably means to distinguish between each denomination so as to determine whether or not to dispense the banknote and/or to determine the value of the dispensed banknote. Alternatively, however, the banknotes are of a single denomination, and there may be a number of different stores each for receiving and dispensing banknotes of a respective denomination to facilitate the dispensing of a desired amount of change.

Another aspect of the invention relates to a storage means which is arranged to hold a stored stack of banknotes while a new banknote is added to the stack by sliding it over the uppermost banknote. Preferably, a finger can be operated to engage an end of the stack. By holding the stack at one end, it is possible to prevent the newly-added banknote from moving the topmost banknote in the stack. This arrangement provides a replenishable banknote store which does not require a bulky mechanism for adding new banknotes.

According to a further aspect of the invention, a banknote store has means for engaging the lateral edges of the endmost banknote in a stack as a new banknote is being added to the stack by transporting it along a direction substantially parallel to the edges, the engaging means then disengaging the lateral edges of the uppermost banknote and then engaging lateral edges of the new banknote to allow the new banknote to be added to the stack. The engaging means thus facilitate the addition of new banknotes to the stack, and prevent problems caused by possible tears and folds at the edges of the banknotes. The engaging means can also help in avoiding the movement of the topmost banknote as a result of friction with the newly-added banknote. This aspect can be combined with the above-mentioned finger for engaging the end of the stack, so that the stack is held in position by a combination of the engaging means and the finger as the new banknote is added.

In a preferred embodiment, the new banknote is transported to the stack by a transport means which operates on the lateral edges of the new banknote where the lateral edges are supported by the engaging means. Accordingly, the new banknote is transported by pressure which is applied to the new banknote but which is prevented from being applied to the stack by virtue of the engaging means, this ensuring a more reliable operation. Preferably, the transport means is also arranged to dispense an individual banknote from the stack, and for this purpose it can be arranged to move from a position overlying the engaging means, for addition of a new note, to a position between the engaging means for dispensing a note.

The stores of the preferred embodiments of the invention have the banknote stack disposed on a movable platform. In some embodiments, this movable platform is provided with a transport mechanism for discharging the stack as a bundle. Stores having this feature may be particularly useful as escrows.

An arrangement embodying the invention will now be described by way of example with reference to the accompanying drawings, in which:

FIG. 1 schematically shows a banknote handling apparatus in accordance with the invention;

Figure 10:
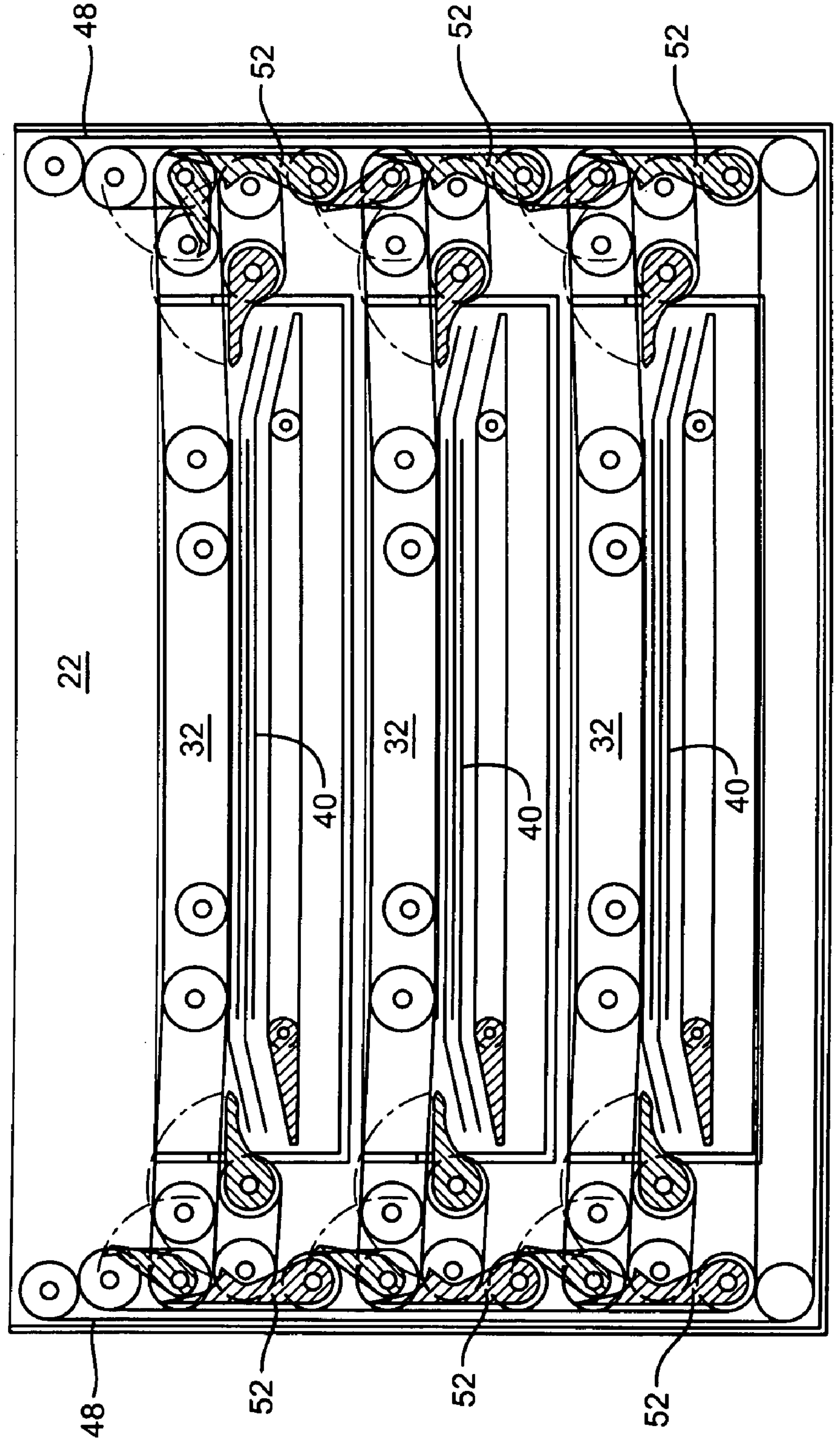
Figure 11:
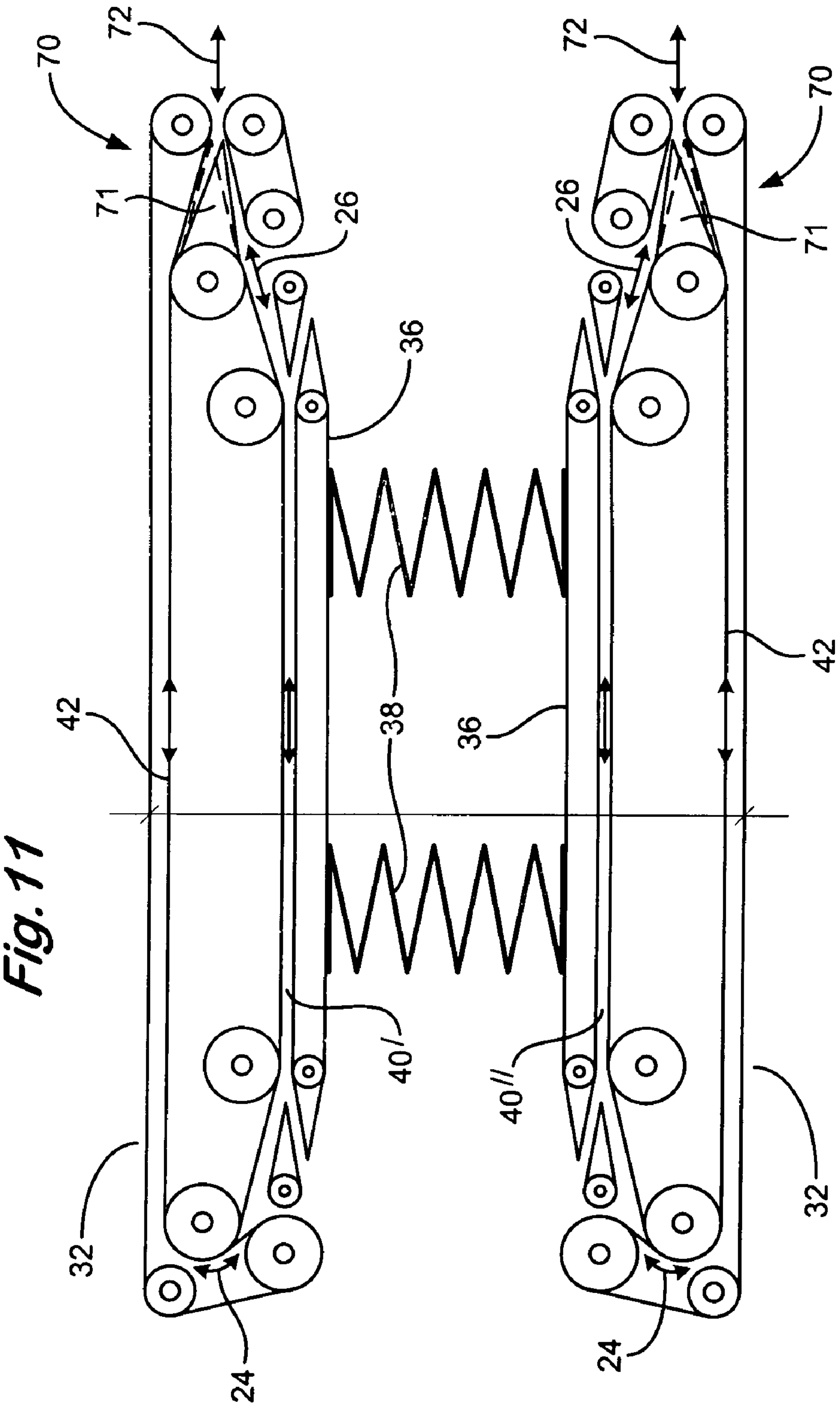
Figure 12:
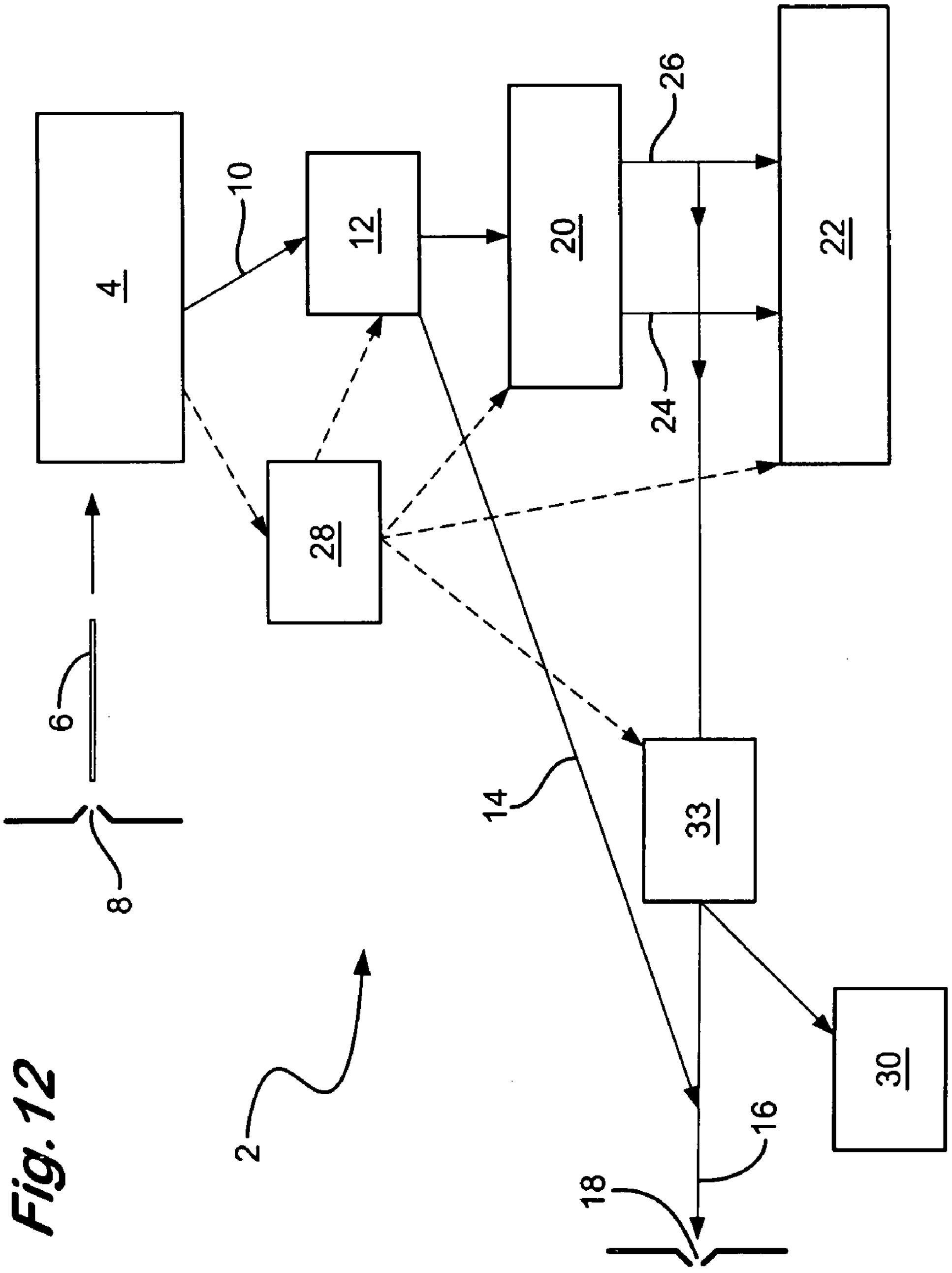
Figure 13:
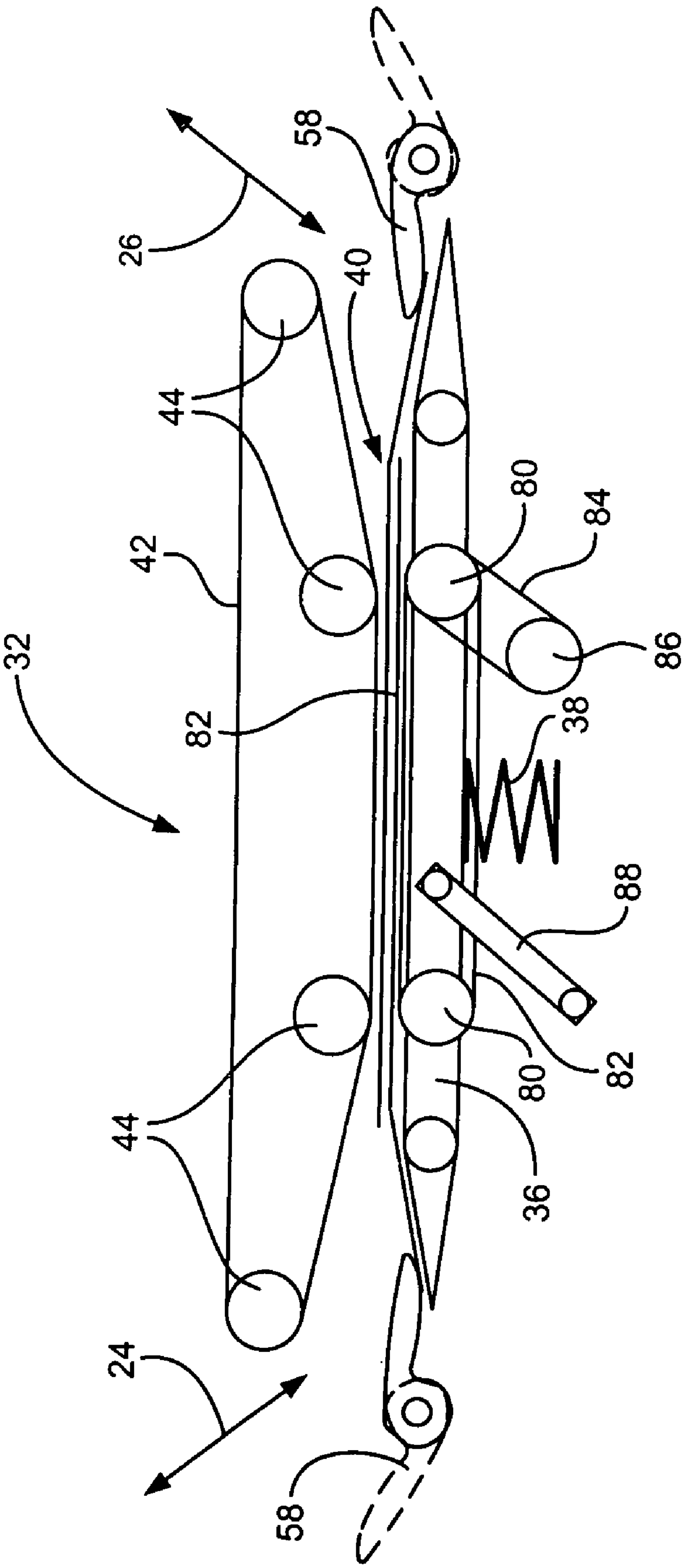
Figure 14:
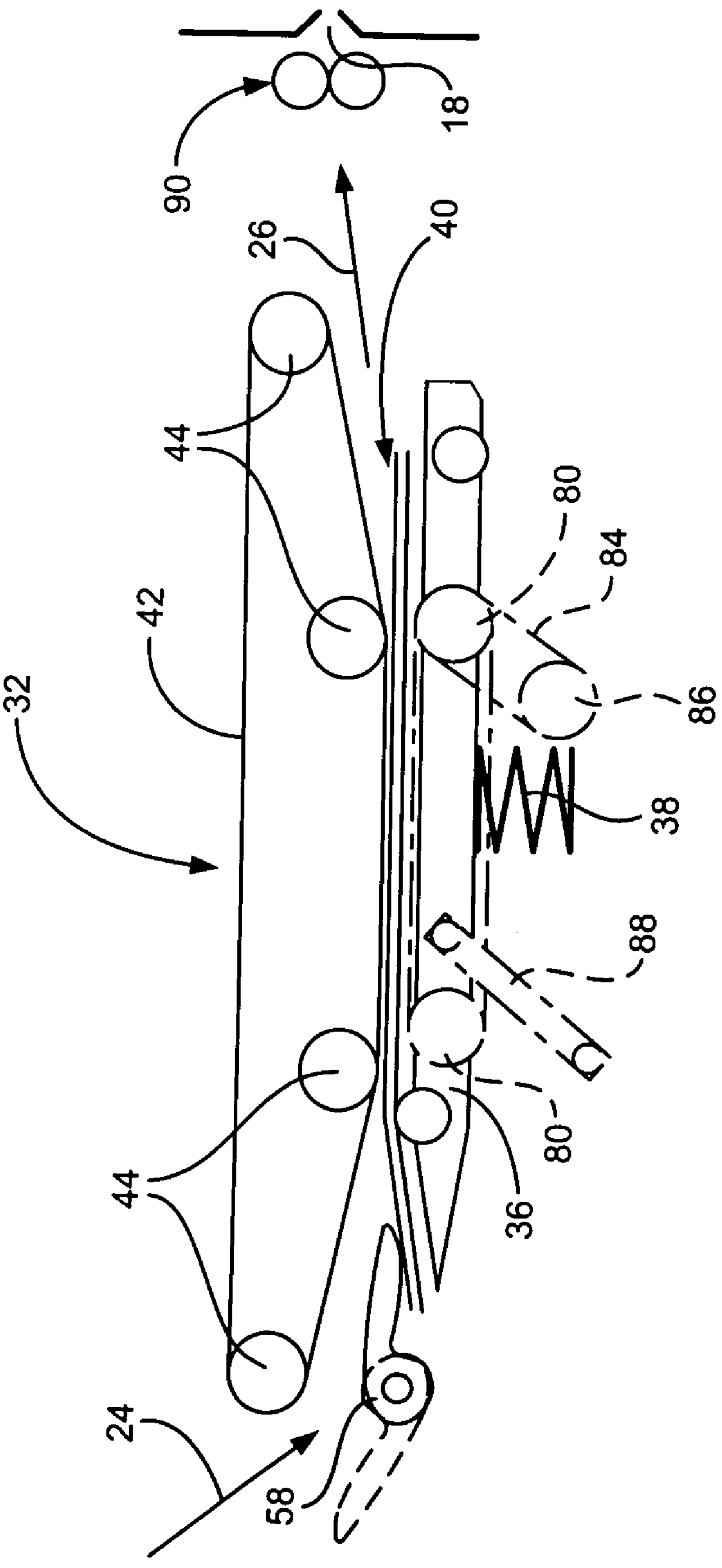
Figure 15A:
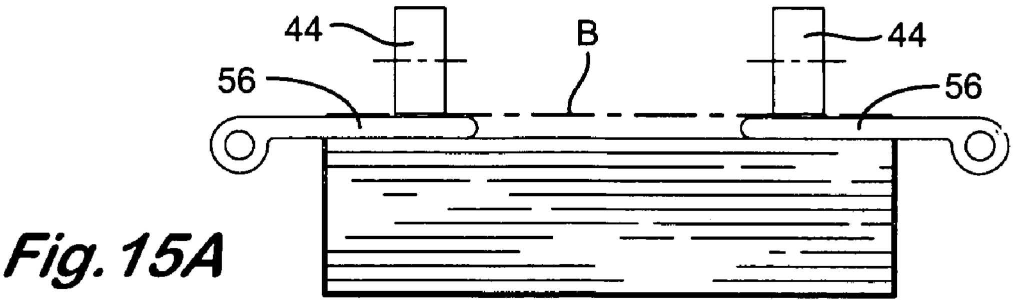
Figure 15B:
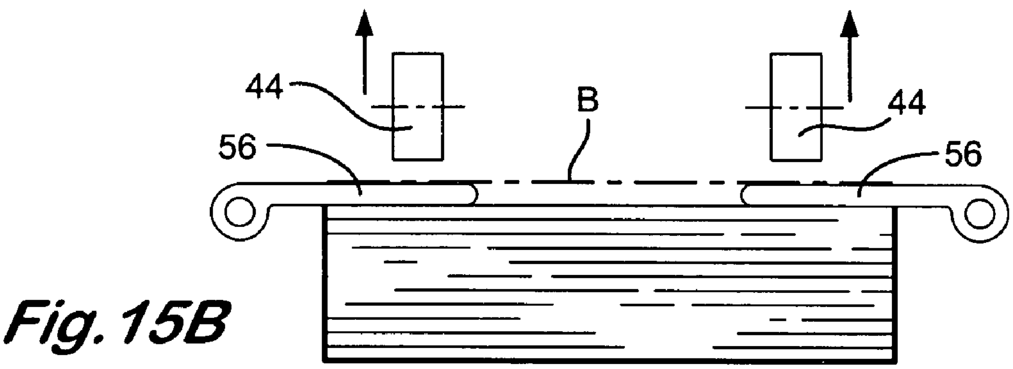
Figure 15C:
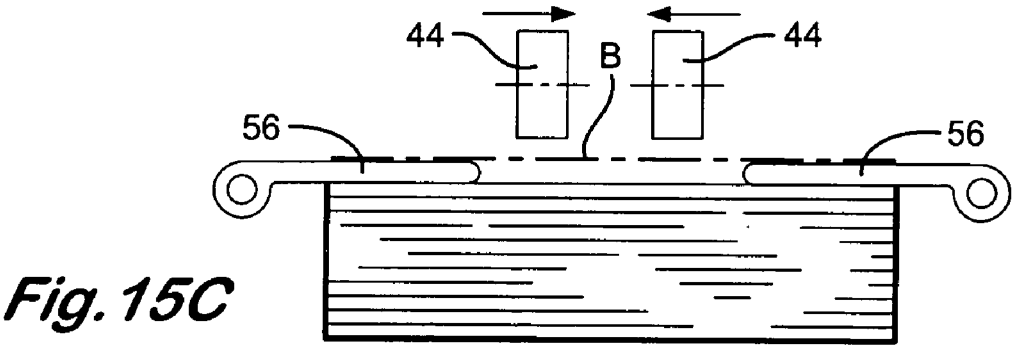
Figure 15D:
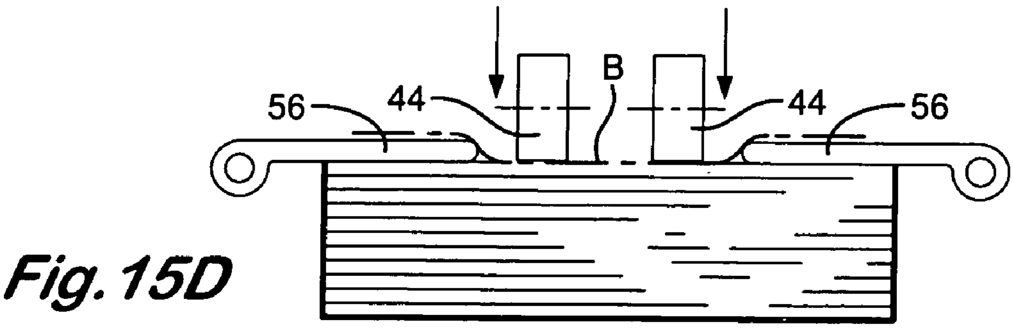
Figure 15E:
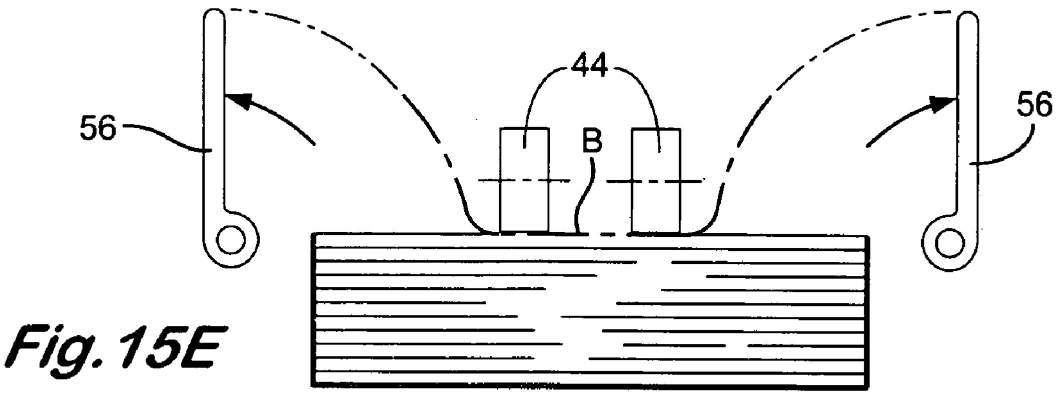
Figure 15F:
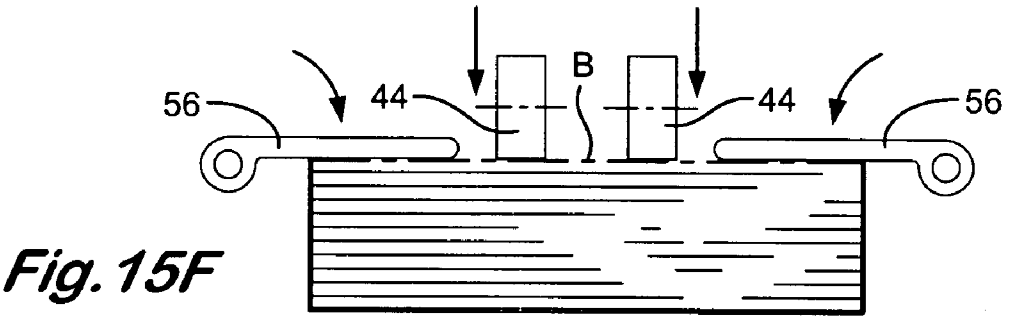
Figure 15G:
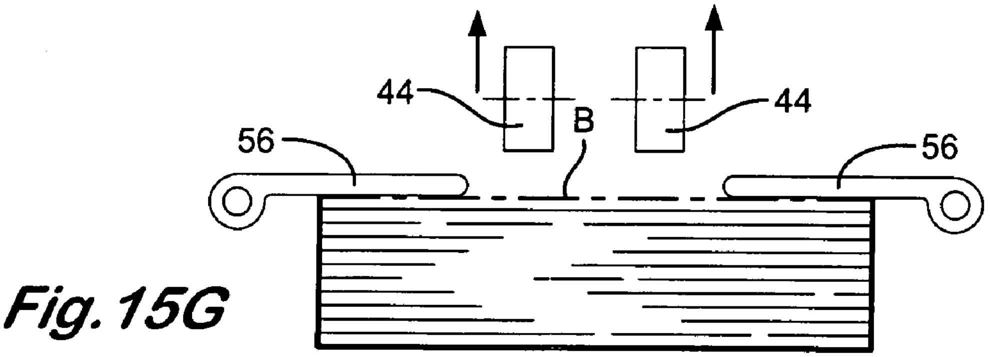
Figure 15H:
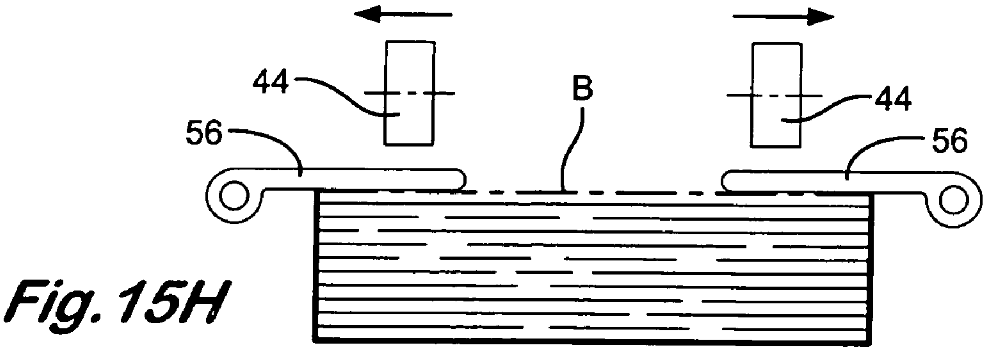
Figure 16A:
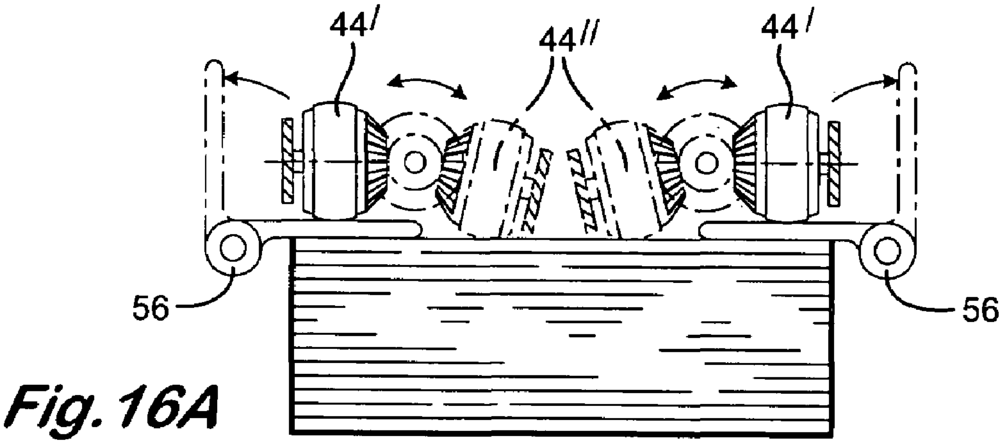
Figure 16B:
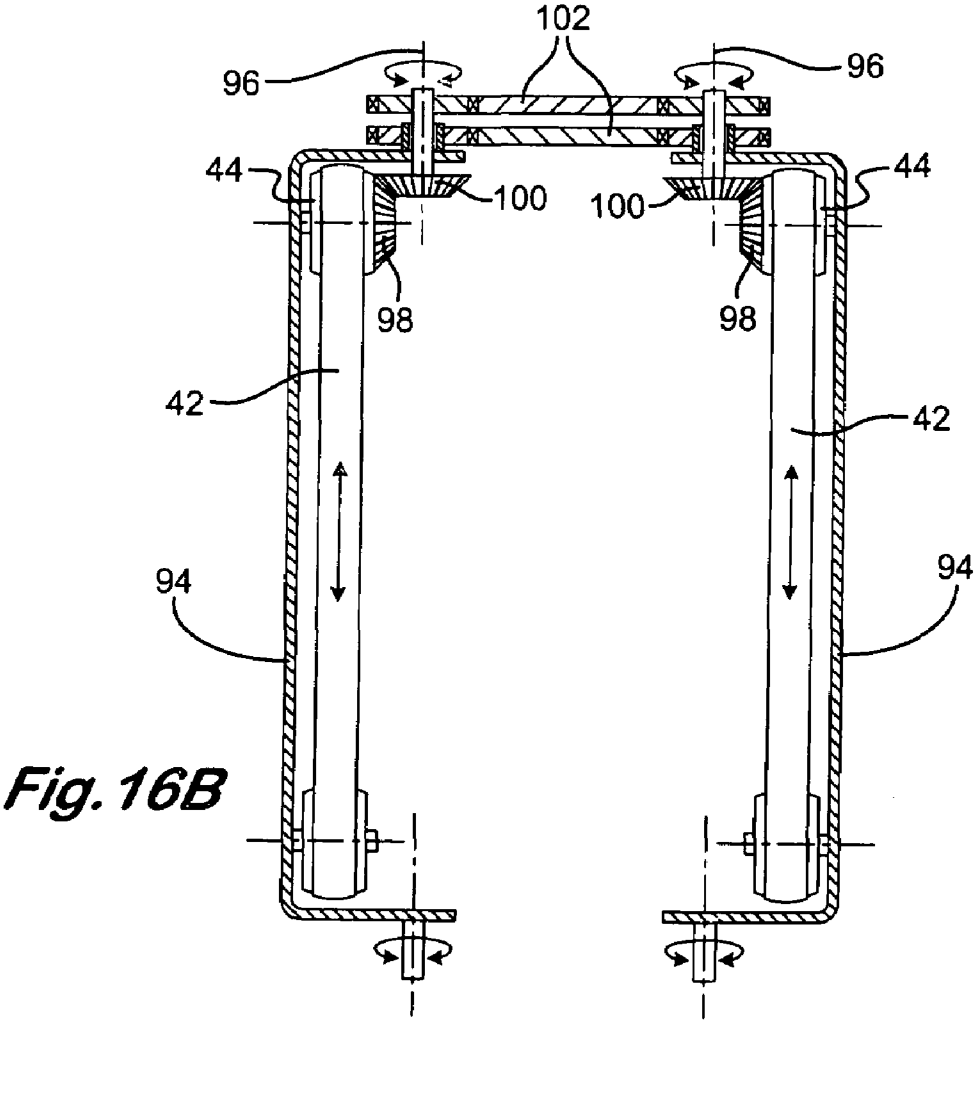

FIG. 10 schematically shows a banknote storage apparatus including a plurality of stores each of which is similar to the store of FIGS. 2 to 7;

FIG. 11 shows a pair of stores each of which is similar to the store of FIGS. 2 to 7;

FIG. 12 schematically shows a banknote handling apparatus in accordance with another embodiment of the invention;

FIG. 13 is a schematic side view of the banknote store of the apparatus of FIG. 12;

FIG. 14 is a schematic side view of a banknote store in accordance with a further embodiment of the invention;

FIGS. 15A to 15H are end views showing various stages of operation of a further embodiment of the invention; and FIGS. 16A and 16B are end and plan views of another embodiment of the invention.

Figure 1:
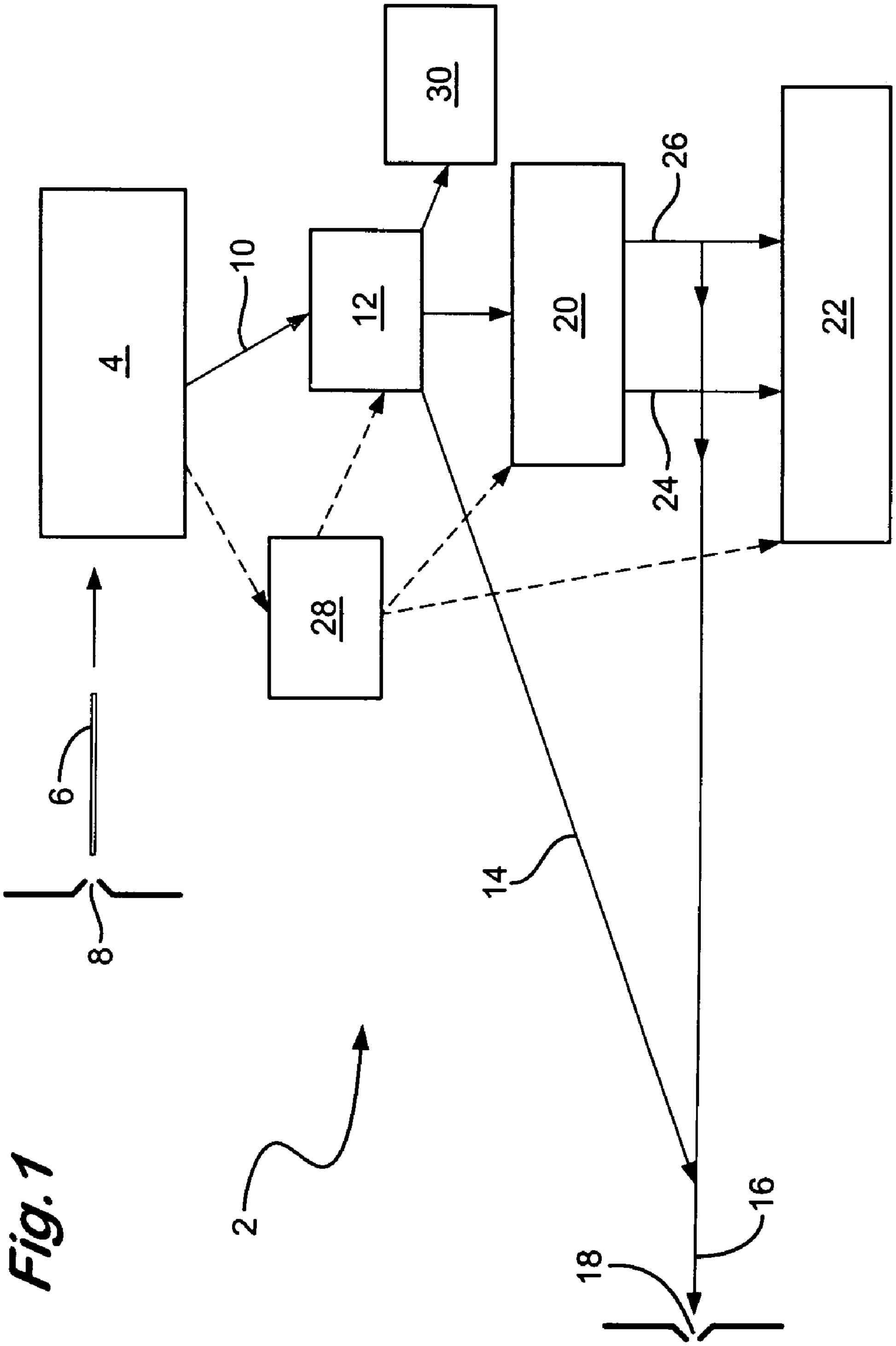

Referring to FIG. 1, this shows a banknote handling apparatus 2 which comprises a banknote validator 4 which is operable to receive a banknote 6 from an apparatus inlet 8. The validator 4 is operable to determine the authenticity and denomination of the banknote and then to deliver the banknote via a path 10 to a first switch 12. If the banknote has been found to be invalid, the switch 12 can be arranged to direct the banknote via paths 14 and 16 to an apparatus outlet 18.

The switch 12 can alternatively direct the banknote 6 to a further switch 20, from which the banknote is directed to a storage apparatus 22 via either a first storage path 24 or a second storage path 26.

As will be explained below, the storage apparatus 22 can also dispense banknotes via the paths 24 and 26, from which they are sent to the outlet 18 via the path 16.

The handling apparatus 2 has a control means 28 responsive to signals from the validator 4 and operable to control the switches 12 and 20 and the storage means 22. The control 28 is arranged to send to the storage means 22 banknotes of multiple denominations, and to dispense from the storage means 22 individual banknotes of selected denominations so that the total amount dispensed corresponds to a desired change amount.

If desired, the handling apparatus 2 can be provided with an additional storage means 30 which can receive but not dispense bills. The control means 28 can be arranged to control the switch 12 so as to deliver to the store 30 any banknotes of different denominations from those stored in the storage means 22, or banknotes of the same denomination as stored in the storage means 22 if there is no more room in the storage means 22 for banknotes of that denomination. The store 30 can be emptied by a serviceman.

The storage means 22 may comprise a plurality of individual stores each arranged to store a respective denomination. One such individual store is illustrated in FIGS. 2 and 3.

Figure 2:
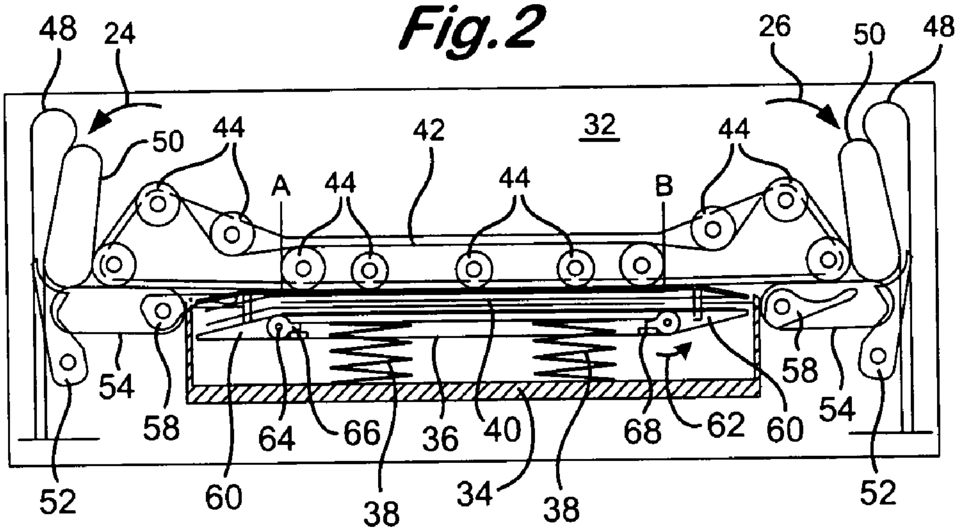
FIG. 2 is a schematic side view, partly in section, showing an individual banknote store of the apparatus of FIG. 1 in the state adopted when a new banknote is being sent to the store.
Figure 3:
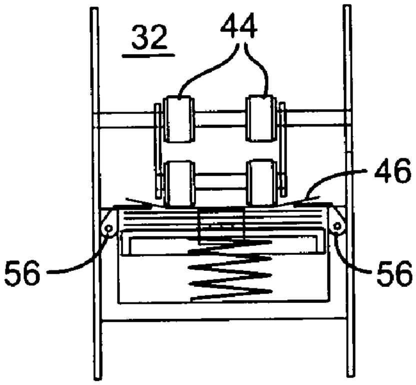
FIG. 3 is an end view of the banknote store of FIG. 2.
Figure 4:
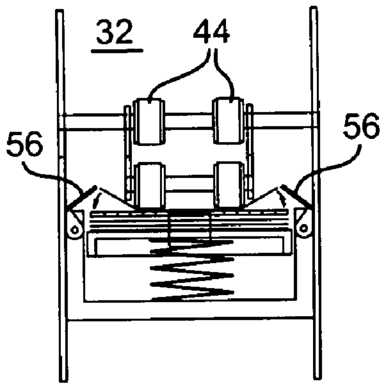
FIG. 4 is a further end view, showing the store in a different state.

The store 32 shown in FIG. 2 comprises a housing 34 containing a platform 36 which is supported on biasing means formed by springs 38 which urge the platform 36 upwardly towards the open top of the housing 34. The platform 36 supports a stack 40 of banknotes, which are held in place against the force of the biasing means 38 by an endless belt 42 guided by rollers 44. The provision of the movable platform 36 thus allows the store 32 to accommodate varying numbers of banknotes within the stack 40.

Banknotes can be received and dispensed via the paths 24 and 26. FIG. 2 shows the store 32 in the condition adopted after having received a banknote via path 24. The received banknote is not illustrated in FIG. 2, but can be seen at 46 in the end view of FIG. 3. The control means 28 is arranged to operate the store 32 so that bills which are received via the path 24 are fed between belts 48 and 50 (at the left of FIG. 2), diverted by a diverter 52 between the belt 42 and a further belt 54, and then driven by the belt 42 over the top of the stack until the trailing edge of the banknote reaches the position marked A in FIG. 2. Bills fed to the store 32 via the path 26 are driven by corresponding belts and diverter 48, 50, 52 and 54 (at the right of FIG. 2) to the stack 40, and are fed until their trailing ends reach a position shown at B in FIG. 2.

The control means 28 is arranged such that banknotes intended for storage in the store 32 are alternately directed to paths 24 and 26, so that the stack 40 comprises banknotes in staggered positions, with alternate banknotes having their ends projecting to the left (with respect to FIG. 2) of the stack, and the intervening banknotes with their ends projecting to the right of the stack.

As shown in FIG. 3, the store 32 is provided with two pivoting side members 56 which are located over the margins of the banknotes in the stack 40 when a new banknote 46 is delivered to the stack, so as to facilitate the transport of the note and to prevent friction causing movement of the banknote presently at the top of the stack. Once the newly-received banknote 46 is in the correct position, the members 56 are pivoted upwardly past the margins of the note 46 (see FIG. 4) and then pivoted back on top of the newly-received note 46.

Figure 5:
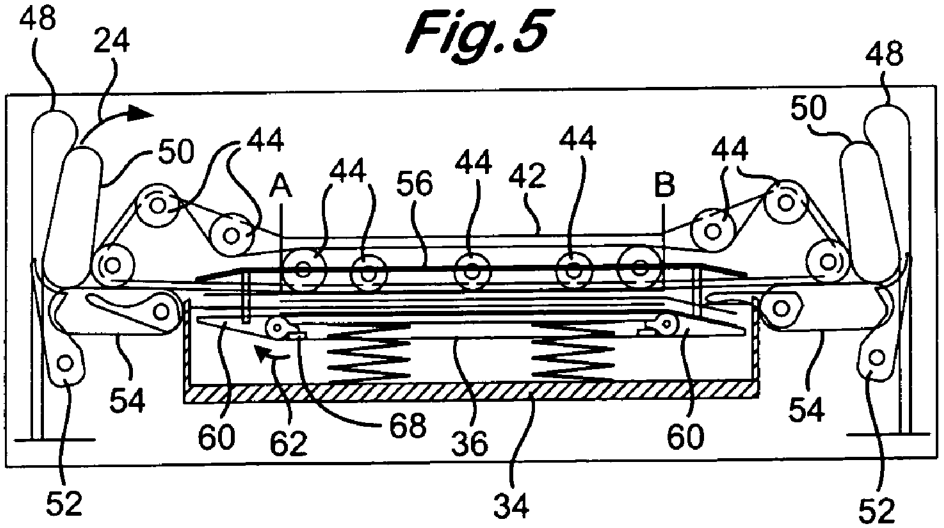
FIG. 5 is a view corresponding to FIG. 2 but showing the banknote store in the condition it adopts when a banknote is being dispensed from the store.

The bill at the top of the stack 40 can be individually dispensed. FIG. 5 shows the store 32 during a dispensing operation, on the assumption that the banknote at the top of the stack was one which was received via the path 26, and therefore one which extends toward the left of the stack 40 as compared with the underlying bill. The store 32 is provided with a finger 58, at the right of FIG. 2, which can be actuated as shown in FIG. 5 to grip the right edge of the underlying bill (and any further bills below the underlying bill which are in the same lateral location). This prevents the underlying bills from moving as the uppermost bill is shifted to the right, by means of the belt 42, so that it can be dispensed via the entry/exit path 24. There is a corresponding finger 58 at the left of the store 32 which is actuated when the uppermost bill is to be dispensed to the right, via entry/exit 26, but which is shown in its deactuated condition in FIG. 5.

The platform 40 has, at each of its left and right ends, a section 60, which is pivotably mounted to the rest of the platform 36 and is biased upwardly as shown by the arrows 62 in FIGS. 2 and 5. Each section 60 is mounted about a shaft 64 on which is located a biasing spring (not shown) to bias the section 60 upwardly. Each shaft carries a stop member 66 having an extension which engages fixed members 68 on the central part of the platform 36 to limit the pivotal movement of the section 60. The purpose of the section 60 is to provide additional compression forces to cooperate with the respective finger 58 in order to hold the protruding ends of the bills, which collectively will be significantly less thick than the part of the stack supported by the central part of the platform 36.

Figure 6:
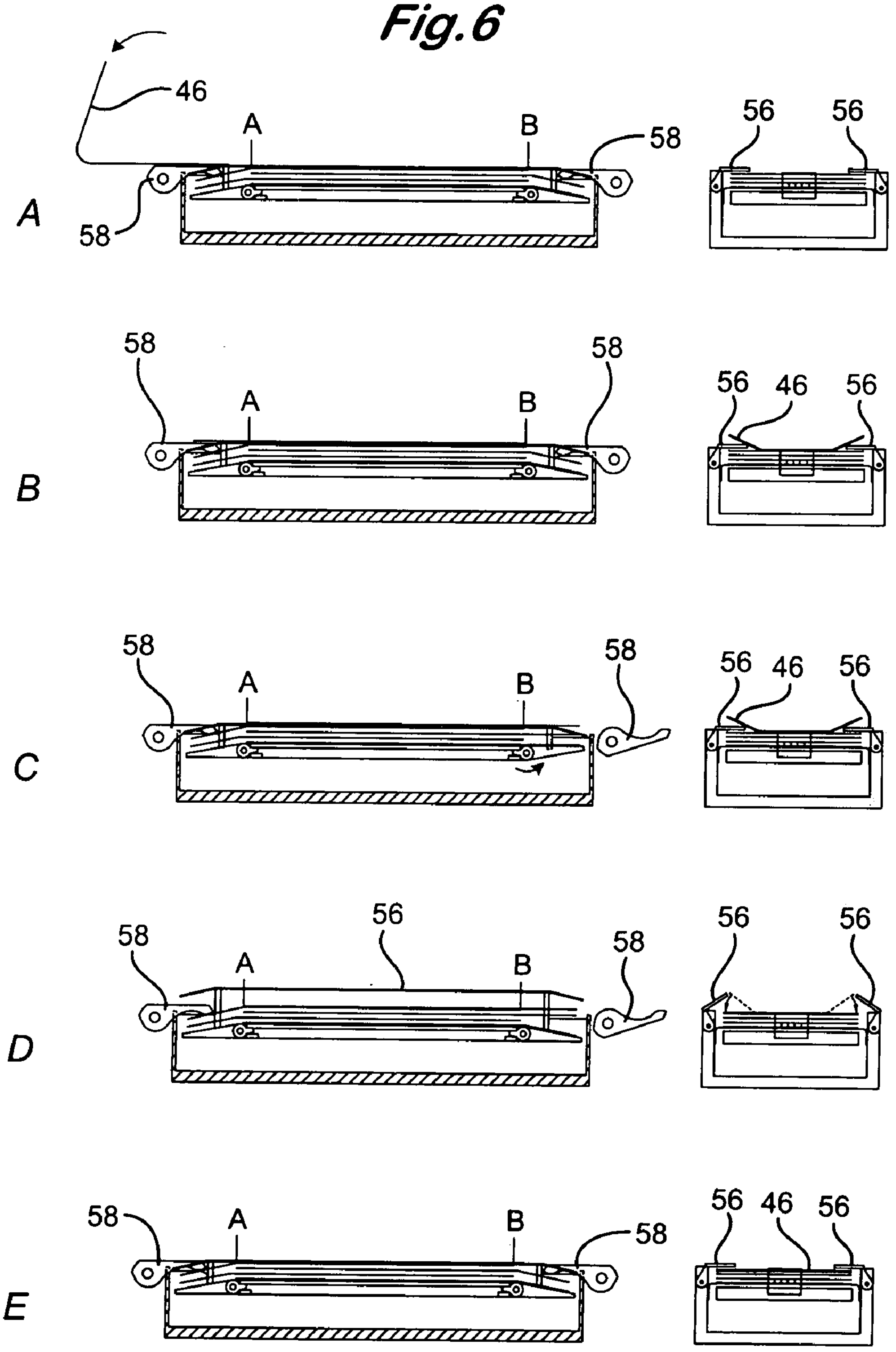
FIGS. 6A to 6E show a sequence of operations resulting in a new banknote being added to the store.
Figure 7:
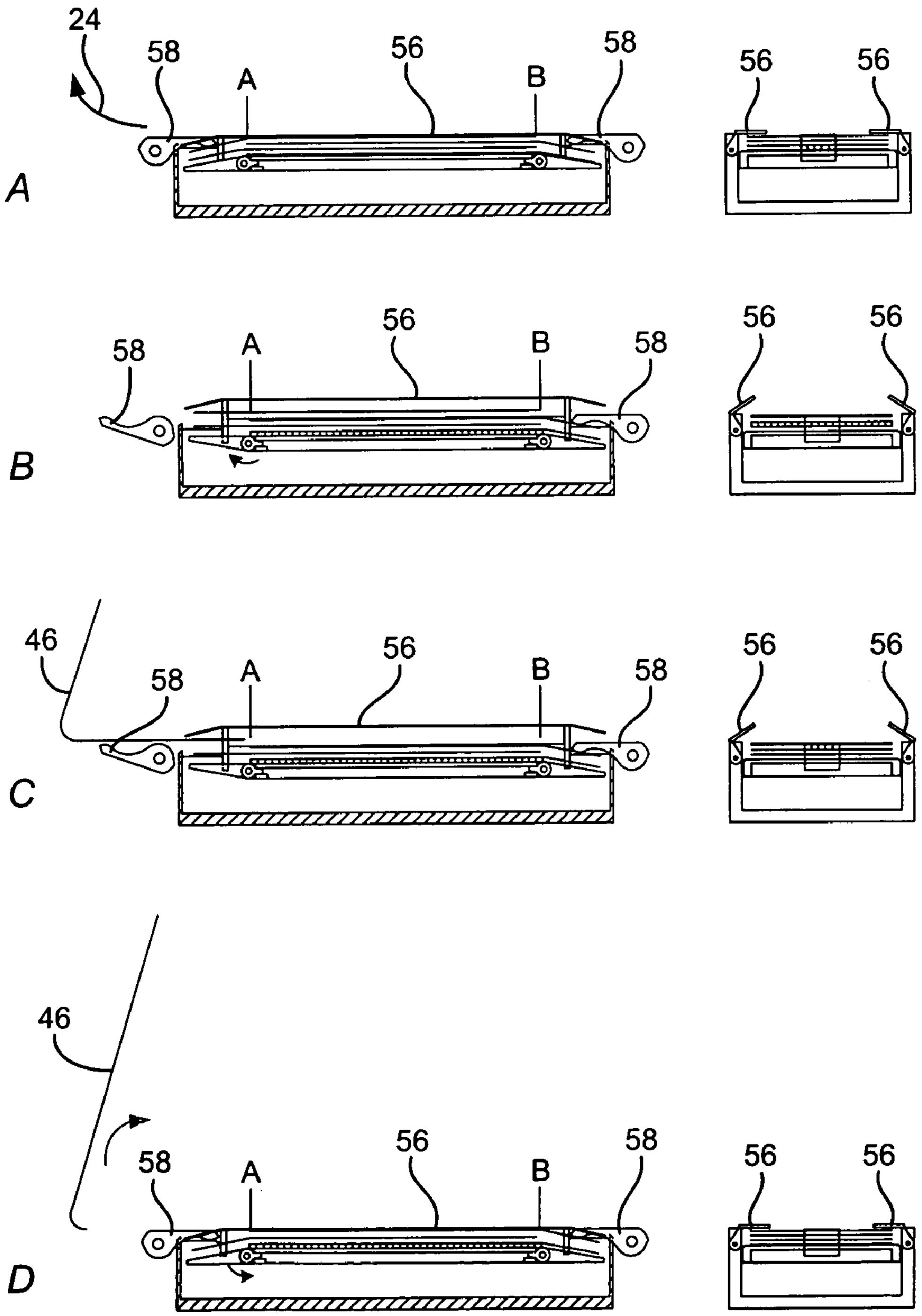
FIGS. 7A to 7D show a sequence of operations involved in dispensing a banknote from the store.

With reference to FIG. 6, the sequence of operations required to store a bill will now be described. Each of FIGS. 6A to 6E comprises a side view and an end view of the store 32.

It is assumed that the switch 12 is set so that the bill is directed to the path 24 and therefore arrives at the left of the store 32. Prior to arrival of the banknote, both fingers 58 are in their actuated state so as to retain the ends of the currently-stored banknotes. The members 56 are positioned above the margins of the stored bills.

In this state, the belts, including the belt 42, are driven so as to move the note 46 from the position shown in FIG. 6A to that shown in FIG. 6B, at which the leading edge of the banknote 46 reaches the point B. At this time, the right finger 58 is deactuated, and thus pivoted away from the banknotes. The belt 42 continues to drive the incoming banknote 46 to the right until its trailing edge reaches the point A, as shown in FIG. 6C.

The members 58 are then pivoted upwardly as shown in FIG. 6D (and FIG. 4), and then downwardly (FIG. 6E) so that the new bill 46 is fully located on the top of the stack, and at the same time the right finger 58 is re-actuated.

The store 32 is thus returned to the condition it had in FIG. 6A, except that there is now an additional bill, received via path 24, on the top of the stack, with one end of the bill projecting to the right from the centre of the stack and gripped by the right finger 58.

If a further bill is to be directed to the stack, the switch 12 will be operated so that it enters via the entry/exit path 26. The operations carried out to store this bill will then be a mirror image of the operations described with reference to the FIGS. 6A to 6E.

FIGS. 7A to 7D are each a side view and end view showing the sequence of operations used to dispense the uppermost bill in the stack 40.

It is assumed that the uppermost bill is one which has been received via the path 26, and thus has an end projecting to the left of the stack 40. This bill will be dispensed via path 24.

In the initial condition shown in FIG. 7A, both fingers 58 are actuated and retain the respective ends of the bills.

In FIG. 7B, the left finger 58 is deactuated, thus allowing the left section 60 to push the supported ends of the bills upwardly, and the two members 56 are pivoted upwardly.

Then, as shown in FIG. 7C, the belts including the belt 42 are driven so as to move the uppermost bill to the left so that it is withdrawn via the entry/exit path 24. Meanwhile, the right finger 58 continues to hold the right end of the underlying bill, and any further bills that have their ends projecting from the right of the stack 40, so that the underlying bill is not caused by friction to move as a result of the withdrawal of the uppermost bill.

After the top bill has been removed (FIG. 7D) the members 56 are pivoted down on to the margins of the stack 40 and the left finger 58 is actuated so as to grip the ends of the banknotes which project from the left of the stack 40.

If the uppermost bill had its end projecting from the left of the stack 40, then the dispensing operations would be a mirror image of those shown in FIGS. 7A to 7D.

The control means 28 keeps track of the state of the bills in the store 32. If a plurality of bills are directed in succession to the store 32, then they are alternatively directed via paths 24 and 26. Similarly, if a plurality of bills are to be dispensed in succession from the store 32, they are alternately dispensed via the paths 24 and 26. If a bill is to be dispensed after an insertion operation, the bill will be dispensed using the opposite one of the paths 24, 26 from the one used to add the banknote. Similarly, the first banknote to be added after a dispensing operation will be added via the opposite one of the paths 24, 26 from the one used for the last note to be dispensed.

An advantage of the techniques of the present invention is that the friction between the banknote being added to, or dispensed from, the stack and the underlying banknote causes an "ironing" effect, resulting in the banknote being made more smooth and less likely to cause jams.

Various arrangements can be used to control the positioning of the bills when added to the stack 40. A sensor may be provided to detect when the trailing edge of the bill reaches the desired point (A or B). The sensor could for example cooperate with one or both of the members 56 to detect the contrast between the bill and the surface of the member, if an optical sensor is used. Alternatively, motors can be driven for a predetermined amount of time, or perhaps a predetermined distance if stepper motors are used, after the bill has been detected at a predetermined position.

Figure 8:
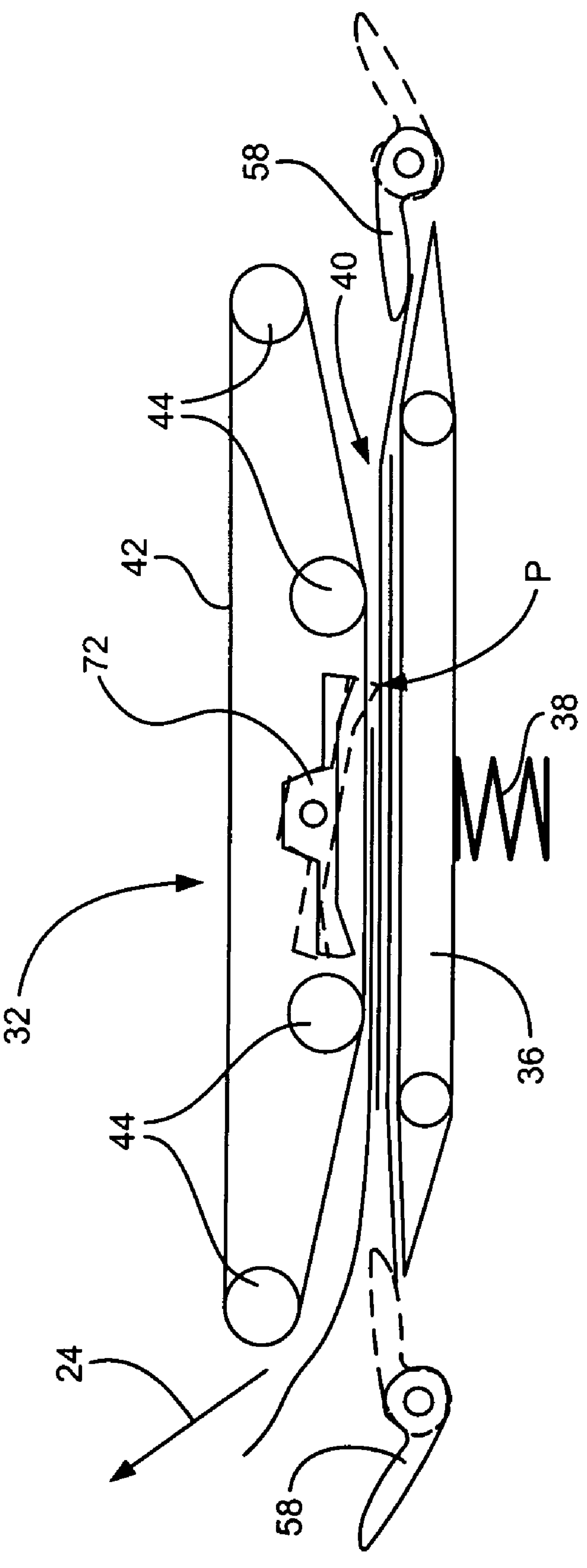
FIGS. 8 and 9 show modified versions of the store.

Various modifications can be made to the arrangements described above. In order to provide a more reliable operation, the store may have a mechanism, such as that shown in FIG. 8, for applying pressure to the second of the banknotes in the stack as the top banknote is being removed, so as to ensure that the second banknote stays in position. Assuming that the topmost banknote is being discharged into path 24, a pivoting member 72 may be arranged to move from the orientation shown in solid lines to the orientation shown in broken lines after the trailing edge of the top banknote has moved beyond the region P, so that extra pressure can be applied at this region to assist in preventing movement of the second banknote. A mirror-image operation occurs if the topmost banknote is being discharged via path 26. Suitable sensors and actuators can be provided to cause the movement to occur at the correct time.

Figure 9:
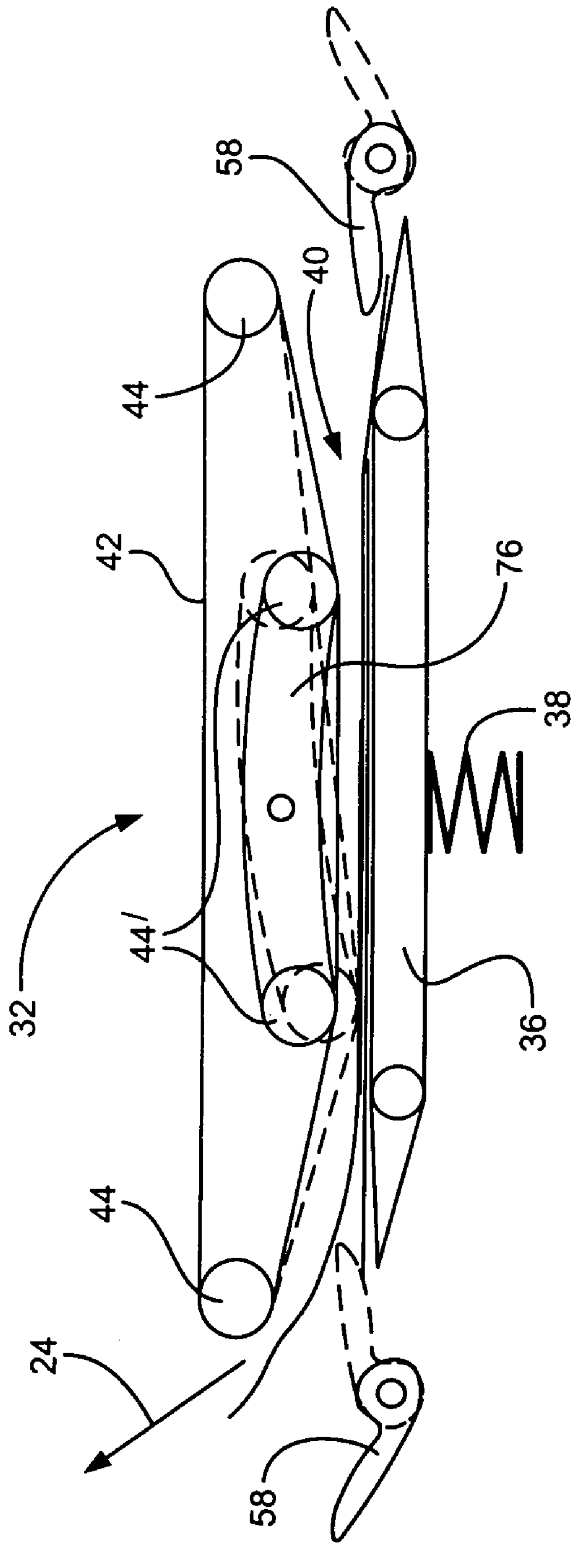

An alternative arrangement is shown in FIG. 9, in which the rollers 44' which are used press the belt 42 onto the top of the stack 40 are arranged on a pivoting support 76. An actuator (not shown) is provided to cause the member 76 to pivot so that the roller 44' adjacent the current exit path (24 in FIG. 9) is lower down than the other roller. The discharged banknote is therefore pulled from the top of the stack more positively.

In the above-described arrangements, the leading edge of each banknote delivered to the store 32 is, at a later time, gripped in order to prevent it from being dispensed with an overlying bill. Instead, the trailing edge of the bill could be gripped. This could be achieved by, for example, halting the motion of the bill 46 shown in FIGS. 6A to 6E when the leading edge reaches point B, instead of when the trailing edge reaches point A. One consequence of this would be that the bill will subsequently be dispensed from the same one of the paths 24, 26 as used to deliver the bill, instead of the opposite path.

Referring to FIG. 10, the storage means 22 preferably includes a plurality of individual stores 32 (three in the example shown in FIG. 10), which may be stacked above each other. By appropriately controlling the positions of the diverters 52 at each end of each store 32, the banknotes delivered to the storage means 22 can be diverted from the belt 48 into any selected one of the stores 32.

Each of the stores 32 preferably stores a single respective denomination. This provides for substantially greater flexibility in selecting the amount to be dispensed.

In a modified embodiment, the individual stores 32 are arranged in one or more pairs, a pair of stores 32 being as shown in FIG. 11. One of the stores 32 is inverted with respect to the other store 32, such that the platforms 36 face each other. These platforms are supported by common biasing means 38. The arrangement is such that the overall volume of the storage means formed by the two stores 32 remains constant, but the proportion of the volume occupied by each of the individual stores 32 can vary depending upon the relative numbers of notes stored by the respective stores

32. Thus, if a first stack 40' of banknotes is relatively small, this allows a second stack, 40", to have more room for expansion. The overall result is to allow a greater saving of space and more flexibility.

It will be noted in FIG. 11 that each of the stores 32 has a switching mechanism 70, including a diverter 71, which receives all incoming banknotes and dispenses all outgoing banknotes using a common path 72. The switching mechanism is arranged to direct notes to, and receive notes from, selectively either one of the paths 24 and 26. The belt 42 is used for conveying banknotes between the switch 70 and the path 24.

Although each of the stores in FIGS. 10 and 11 may be arranged to store a single respective denomination, it will be appreciated that a store 32 can alternatively be arranged to store multiple denominations. In this case, though, preferably means are provided to determine the denomination of each banknote dispensed. This can be done by either (a) keeping a record of the denomination of each banknote sent to the store 32 and consulting this record whenever the banknote is dispensed, or (b) carrying out a test on the dispensed banknote, e.g. using the validator 4, to determine its denomination. The appropriate amount can be dispensed as change. Any banknote removed from the store 32 but not required for change can be temporarily stored and then returned to the store 32.

Although it is preferable for the bills to be of identical size, this is not essential. In the embodiment described above, each banknote is, when added to the stack, driven to a position where its trailing edge is at a predetermined location (A or B), which ensures that its leading edge is correctly positioned to be gripped when an overlying bill is dispensed. However, this arrangement could be modified to handle bills of different lengths by driving them to the extent necessary so that their leading edges extend by the required amount from the same body of the stack 40 to ensure that they are adequately gripped. In these circumstances, the exact locations of their trailing edges is not of significance.

A further, preferred embodiment of the invention will be described with reference to FIGS. 12 and 13. This embodiment incorporates similar features to the embodiment described above, so only the differences will be explained.

In this embodiment, the storage means 22 comprises a single store which is used as an escrow. Thus, all acceptable bills received during a particular transaction are directed to the storage means 22 via the switches 12 and 20. Bills can be individually dispensed from the store and sent to the outlet 18 via a switch 33 and the path 16. At the end of the transaction, all bills remaining in the storage means 22 can be dispensed as a bundle via the switch 33 either to the outlet 18 (if for example the transaction is cancelled), or to the store 30.

Referring to FIG. 13, this shows the store 32 which in this embodiment constitutes the storage means 22. The movable platform 36 includes a transport mechanism so that the stack of bills in the store 32 can be delivered as a bundle to either of the paths 24 and 26.

The transport system comprises rollers 80 around which is disposed an endless belt 82. The notes in the store 32 are sandwiched between the upper surface of the belt 82 and the lower surface of the belt 42.

One of the rollers 80 is driven by a belt 84 which extends around a driving pulley 86 which can be selectively driven by means of a clutch or a separate motor. In order to maintain the correct separation between the roller 80 and the driving pulley 86 around which the belt 84 extends as the platform 36 moves upwardly and downwardly, the platform 36 is preferably mounted on a pantograph, part of which is shown at 88.

In order to dispense the bills as a bundle, the side members 56 (not shown in FIG. 13) are pivoted away from the bills, the fingers 58 are pivoted to the dotted-line positions so that the bills are no longer gripped, and the belts 42 and 82 are driven simultaneously in order to thrust the stored banknotes to either the path 24 or the path 26.

The above-described embodiments have been capable of individually dispensing banknotes by virtue of the manner in which the banknotes are stacked and by use of the fingers 58 for gripping the protruding ends of alternate banknotes. However, some of the advantages of the present invention can be achieved without requiring an arrangement for individual banknote dispensing.

Referring to FIG. 14, for example, this shows a banknote store 32 which is arranged to receive banknotes from only a single inlet path 24. The stack of banknotes is gripped by the finger 58 as each subsequent banknote is delivered to the stack. When the bill reaches the correct position, the finger 58 pivots to its dotted-line position, and then back to the solid line position to clamp the stack, including the newly-arrived banknote. During this operation, the side members 56 (not shown) also pivot upwardly and downwardly, as in the embodiments described above.

This arrangement therefore provides a means for stacking banknotes in a compact manner, without requiring the piston mechanism often used in prior art arrangements for adding a new banknote to the stack. The finger 58 prevents the newly-arriving banknote from disturbing the stack by moving the topmost banknote, and also achieves the "ironing" effect mentioned above.

This store 32 could be used as the store 30 shown in FIGS. 1 and 12, in which banknotes are retained until the store is emptied by a serviceman. Preferably, however, the platform 36 is provided with a transport mechanism similar to that of FIG. 13, as shown in dotted lines, so that the store 32 could constitute the escrow 22 of FIG. 12 (although without the facility for individual dispensing of banknotes). In the latter case, the path 24 may be used exclusively as the inlet path, and the path 26 used as the outlet. This would have an advantage in that the banknotes would all have their left edges aligned in the arrangement of FIG. 14, and these would be the trailing edges as they are dispensed, so that these trailing ends can be reliably gripped by a pinch mechanism 90 provided at the outlet 18. Alternatively, however, it would be possible to use the path 24 as both the inlet and the outlet, and omit the path 26.

The embodiments described above all have lateral side members 56, although they are not shown in all of the drawings. These serve a useful purpose in preventing newly-added banknotes from becoming jammed as a result of engagement with torn or folded edges or corners of the currently-stored banknotes.

In the above-described arrangements, the transport mechanism, and in particular the belt 42, is used to engage the banknotes in a location between the side members 56, so that it can be used for both transporting newly-arrived banknotes and for dispensing the topmost banknote. In modified embodiments to be described below, the transport mechanism is instead arranged to engage the lateral edges of newly-arriving banknotes in regions disposed over the side members 56. This reduces any frictional engagement with the currently-stored bills, thus producing a more reliable operation. FIG. 15A to FIG. 15H schematically show such a modified arrangement. As shown in FIG. 15A, rollers 44 are arranged to press belts 42 (not shown) on to a newly-arriving banknote B in regions above the side members 56 so that the banknote is driven in a direction perpendicular to the plane of the drawing. Once the banknote has reached the correct lateral position, the rollers 44 are lifted (FIG. 15B), moved together (FIG. 15C) and then moved downwardly (FIG. 15D) to engage the new banknote in the region between the side members 56.

These side members 56 are then lifted up and pivoted down again (FIGS. 15E and 15F) to press the new banknote on to the top of the stack. Dispensing of the banknote can then occur with the rollers 44 in the state shown in FIG. 15F.

If a new banknote arrives, the rollers are moved upwardly and outwardly as shown in FIGS. 15G and 15H, and then down back to the position shown in FIG. 15A to drive the new banknote on to the top of the stack.

The belts 42 could be omitted in this arrangement, so that the banknotes are directly acted upon by the rollers 44.

FIG. 16A and FIG. 16B show an alternative version in which the rollers 44 are mounted on frames 94 which are pivoted about axes 96. The rollers 44 have conical gears 98 engaging further conical gears 100 also mounted about the axes 94. Various additional gears 102 are provided for driving the conical gears 100 and thus the rollers 44, and also for driving the frames 94 for rotation about the axes 96. Thus, referring to FIG. 16A, the rollers 44 are in the position shown at 44' when a note is added to the stack, the lateral edges of the note being engaged between the rollers 44 and the side members 56. After the banknote has been driven to its correct position, the frames 94 are pivoted so that the rollers are switched to the positions shown at 44", and the side members 56 are moved to and from the broken line positions to locate the new banknote on to the top of a stack. The rollers 44 are then in a position to dispense the uppermost banknote.

By taking steps to avoid applying friction to the uppermost banknote of the stack as a new banknote is being added, such as in the arrangements of FIGS. 15 and 16, it may be possible to dispense with the fingers 58 in the above-described embodiments, and particularly in the embodiment of FIG. 14 in which the banknotes are not required to be dispensed individually.

What is claimed is:

1. A banknote store arranged to store a stack of banknotes which can be dispensed individually from the store, each banknote having an edge extending beyond the area occupied by an adjacent banknote, the banknote store including means for holding the banknote by the extending edge as the adjacent banknote is frictionally engaged and dispensed to prevent it from being conveyed by frictional engagement with the adjacent banknote, wherein successive banknotes have opposite edges extending beyond the area occupied by the respective adjacent banknotes.

2. A store as claimed in claim 1, wherein the banknotes are elongate, and the opposite edges are disposed at the longitudinal ends of the banknote.

3. A store as claimed in claim 1, including a plurality of gripping means each of which can be actuated to grip banknote edges at a respective side of the stack to permit an endmost banknote of the stack to be individually dispensed.

4. A store as claimed in claim 1, including support means for supporting the stack, the support means comprising means for applying pressure to the extending edges of the banknotes so as to facilitate the gripping thereof.

5. A banknote store as claimed in claim 1, including means for engaging and moving the banknotes at both ends of the stack in order to discharge the stack as a bundle.

6. A banknote store as claimed in claim 1 wherein, when in contact with a banknote, the means for holding the banknote contacts an upper planar surface of the banknote.

7. A banknote store arranged to store a stack of banknotes which can be dispensed individually from the store, each banknote having an edge extending beyond the area occupied by an adjacent banknote, the banknote store including means for holding the banknote by the extending edge as the adjacent banknote is frictionally engaged and dispensed to prevent it from being conveyed by frictional engagement with the adjacent banknote, and means for frictionally engaging and feeding banknotes to the store in order to form said stack.

8. A store as claimed in claim 7, wherein the feeding means is arranged to feed banknotes to the store via a plurality of respective paths, each path delivering a banknote to a respective lateral position within the stack, so that banknotes delivered via different paths adopt different lateral positions.

9. A store as claimed in claim 8, wherein the feeding means is operable to deliver banknotes to the stack via two paths which feed banknotes in opposite directions to the stack.

10. A banknote store arranged to store a stack of banknotes which can be dispensed individually from the store, each banknote having an edge extending beyond the area occupied by an adjacent banknote, the banknote store including means for holding the banknote by the extending edge as the adjacent banknote is dispensed in a plane substantially parallel to the banknotes of the store to prevent the held banknote form being conveyed by frictional engagement with the adjacent banknote, wherein successive banknotes have opposite edges extending beyond the area occupied by the respective adjacent banknotes.

11. Banknote storage means comprising:

a plurality of banknote stores each of which is arranged to store a stack of banknotes which can be dispensed individually from the store, each banknote having an edge extending beyond the area occupied by an adjacent banknote, each banknote store including means for holding the banknote by the extending edge as the adjacent banknote is dispensed in a plane substantially parallel to the banknotes of the store to prevent the held banknote form being conveyed by frictional engagement with the adjacent banknote, wherein successive banknotes have opposite edges extending beyond the area occupied by the respective adjacent banknotes, and common feed means for feeding banknotes selectively to any one of the stores.

12. Banknote storage means as claimed in claim 11, wherein the banknote stores are arranged in a stack.

13. A method of handling banknotes, the method comprising receiving banknotes, delivering the banknotes to first and second lateral positions within a banknote stack, the first and second positions being offset with respect to each other such that banknotes delivered to the first position have ends which extend beyond the ends of the banknotes delivered to the second position, and frictionally engaging and removing from the stack an endmost banknote delivered to the first position while gripping the extending end of an adjacent banknote delivered to the second position so that the adjacent banknote is not carried away by the endmost banknote.

14. A method of handling banknotes as claimed in claim 13 which includes the step of delivering the banknotes alternately via first and second paths to the first and second lateral positions within the banknote stack.

* * * * *

UNITED STATES PATENT AND TRADEMARK OFFICE

CERTIFICATE OF CORRECTION

PATENT NO. : 7,017,802 B2 Page 1 of 1
APPLICATION NO. : 10/100885
DATED : March 28, 2006
INVENTOR(S) : André Gerlier It is certified that error appears in the above-identified patent and that said Letters Patent is hereby corrected as shown below:

Col. 10, claim 7, line 7, after “banknote” (first occurrence) insert --in an alternating matter--.

Col. 10, claim 7, line 10, “it” should be --said banknote--.

Signed and Sealed this

Tenth Day of April, 2007

JON W. DUDAS
*Director of the United States Patent and Trademark Office*